(12) United States Patent
Kim

(10) Patent No.: US 8,770,684 B2
(45) Date of Patent: Jul. 8, 2014

(54) REFRIGERATOR AND MANUFACTURING METHOD OF THE SAME

(71) Applicant: LG Electronics Inc., Seoul (KR)

(72) Inventor: Pansoo Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/969,957

(22) Filed: Aug. 19, 2013

(65) Prior Publication Data

US 2013/0327075 A1 Dec. 12, 2013

Related U.S. Application Data

(63) Continuation of application No. 12/863,050, filed as application No. PCT/KR2008/007498 on Dec. 17, 2008, now Pat. No. 8,523,304.

(30) Foreign Application Priority Data

Feb. 21, 2008 (KR) ........................ 10-2008-0015776

(51) Int. Cl.
*A47B 96/04* (2006.01)

(52) U.S. Cl.
USPC ..................................................... 312/405.1

(58) Field of Classification Search
CPC ........... H04N 5/64; F25D 23/02; F25D 23/12; F25D 29/005
USPC .......... 312/405, 405.1, 7.2, 204, 401; 62/331, 62/125; 49/501
See application file for complete search history.

(56) References Cited

U.S. PATENT DOCUMENTS

| | | |
|---|---|---|
| 2,766,856 A | 10/1956 | Nelsson |
| 6,256,075 B1 | 7/2001 | Yang |
| 6,310,767 B1 | 10/2001 | Spear et al. |
| 6,480,243 B2 | 11/2002 | Yamamoto |
| 6,575,541 B1 | 6/2003 | Hedrick et al. |
| 7,046,310 B2 | 5/2006 | Lee |
| 7,155,923 B2 | 1/2007 | Nam et al. |
| 7,260,954 B2 | 8/2007 | Jang et al. |
| 7,516,625 B2 | 4/2009 | Kwon |

(Continued)

FOREIGN PATENT DOCUMENTS

| | | |
|---|---|---|
| CN | 1940424 A | 4/2007 |
| CN | 101097790 A | 1/2008 |

(Continued)

OTHER PUBLICATIONS

English translation of JP 2002-039673, published Feb. 6, 2002.*

(Continued)

*Primary Examiner* — Darnell Jayne
*Assistant Examiner* — Hiwot Tefera
(74) *Attorney, Agent, or Firm* — Birch, Stewart, Kolasch & Birch, LLP

(57) ABSTRACT

The present embodiment provides a refrigerator. The refrigerator according to the present embodiment includes a panel member forming at least a portion of the exterior of the refrigerator, an inner case of which at least portion is spaced from the panel, a display case provided at one side of the panel member, insulating material filled in space between the panel member and the inner case, and a display unit mounted on the display case after the filling of the insulating material is completed.

50 Claims, 5 Drawing Sheets

(56) References Cited

U.S. PATENT DOCUMENTS

| | | |
|---|---|---|
| 7,942,013 B2 | 5/2011 | Kim |
| 8,109,580 B1 | 2/2012 | Didier et al. |
| 8,375,639 B2 | 2/2013 | Lee et al. |
| 2004/0177624 A1 | 9/2004 | Wo |
| 2004/0183413 A1 | 9/2004 | Koo |
| 2005/0097912 A1 | 5/2005 | Nam et al. |
| 2005/0146250 A1 | 7/2005 | Chung et al. |
| 2005/0190309 A1 | 9/2005 | Takita et al. |
| 2006/0201043 A1 | 9/2006 | Kim et al. |
| 2007/0056303 A1 | 3/2007 | Choi et al. |
| 2007/0096606 A1 | 5/2007 | Ryu |
| 2008/0164796 A1 | 7/2008 | McCoy et al. |
| 2008/0165998 A1 | 7/2008 | LeClear et al. |
| 2008/0202844 A1 | 8/2008 | Leclear et al. |
| 2008/0231159 A1 | 9/2008 | Lee et al. |
| 2008/0238279 A1 | 10/2008 | Jang |
| 2008/0297012 A1 | 12/2008 | Cooper |
| 2008/0297013 A1 | 12/2008 | Iwai et al. |
| 2010/0019639 A1 | 1/2010 | Son |
| 2010/0024466 A1 | 2/2010 | Kwon |
| 2010/0066226 A1 | 3/2010 | Luisi et al. |
| 2012/0099255 A1 | 4/2012 | Lee et al. |

FOREIGN PATENT DOCUMENTS

| | | | |
|---|---|---|---|
| GB | 2186311 | A | 8/1987 |
| JP | 2002-039673 | A | 2/2002 |
| KR | 20-2001-0001242 | U | 1/2001 |
| KR | 10-0582082 | B1 | 5/2006 |
| KR | 10-0634365 | B1 | 10/2006 |
| KR | 10-0634367 | B1 | 10/2006 |
| KR | 10-2007-0034835 | A | 3/2007 |
| WO | WO 03/081153 | A1 | 10/2003 |
| WO | WO 2007/011178 | A1 | 1/2007 |
| WO | WO 2007/078149 | A1 | 7/2007 |

OTHER PUBLICATIONS

English translation of KR10-20070034835.

\* cited by examiner

REFRIGERATOR AND MANUFACTURING METHOD OF THE SAME

CROSS REFERENCE TO RELATED APPLICATIONS

This application is a Continuation of co-pending application Ser. No. 12/863,050 filed on Jul. 15, 2010, which is the national phase of PCT International Application No. PCT/KR2008/007498 filed on Dec. 17, 2008, and which claims priority to Application No. 10-2008-0015776 filed in the Republic of Korea on Feb. 21, 2008. The entire contents of all of the above applications are hereby incorporated by reference.

TECHNICAL FIELD

The present embodiment relates to a refrigerator and a manufacturing method of the same.

BACKGROUND ART

A refrigerator is an apparatus storing for foods at a low temperature. The refrigerator includes a main body in which a storage chamber is formed and a door coupled to the main body to open/close the storage chamber. And, a display unit displaying at least an operation state of the refrigerator is provided in the main body or the door.

DISCLOSURE OF INVENTION

Technical Problem

An object of the present embodiment is to provide a refrigerator that is easily mounted with a display unit, and has a simple structure and a low manufacturing cost.

Technical Solution

According to one aspect of the present embodiment, there is provided a refrigerator having a main body in which a storage chamber is formed and a door to open/close the storage chamber, the refrigerator comprising: a panel member forming at least a portion of the exterior of the refrigerator; an inner case of which at least portion is spaced from the panel; a display case provided at one side of the panel member; insulating material filled in space between the panel member and the inner case; and a display unit mounted on the display unit after the filling of the insulating material is completed.

According to another aspect of the present embodiment, there is provided a manufacturing method of a refrigerator comprising: filling insulating material between an inner case and a panel member forming a portion of the exterior of the refrigerator; and inserting a display unit into space between the insulating material and the panel member.

According to another aspect of the present embodiment, there is provided a manufacturing method of a refrigerator comprising: forming a mounting space for mounting a display unit and an insulation space for insulating between an inner case and a panel member forming a portion of the exterior of the refrigerator; filling the insulating material in the insulation space; mounting the display unit on the mounting space; and covering the display unit in a state where the display unit is mounted.

Advantageous Effects

With the proposed embodiment, the display unit is mounted on an inner side of the door or an inner side of the body so that the display unit is not exposed to the outside of the front panel, making it possible to improve an esthetic sense of the front panel.

Also, the display unit is inserted into the door or the body after the filling of insulating material is completed, making it possible to simplify assembly of the door or the body and to reduce a manufacturing cost.

The display unit can be slidingly drawn-out from the door or the main body, making it possible to check and repair the display unit.

BRIEF DESCRIPTION OF THE DRAWINGS

The above and other objects, features and advantages of the present invention will become apparent from the following description of preferred embodiments given in conjunction with the accompanying drawings, in which.

MODE FOR THE INVENTION

Hereinafter, an embodiment will be described in detail with reference to the accompanying drawings.

Figure 1:
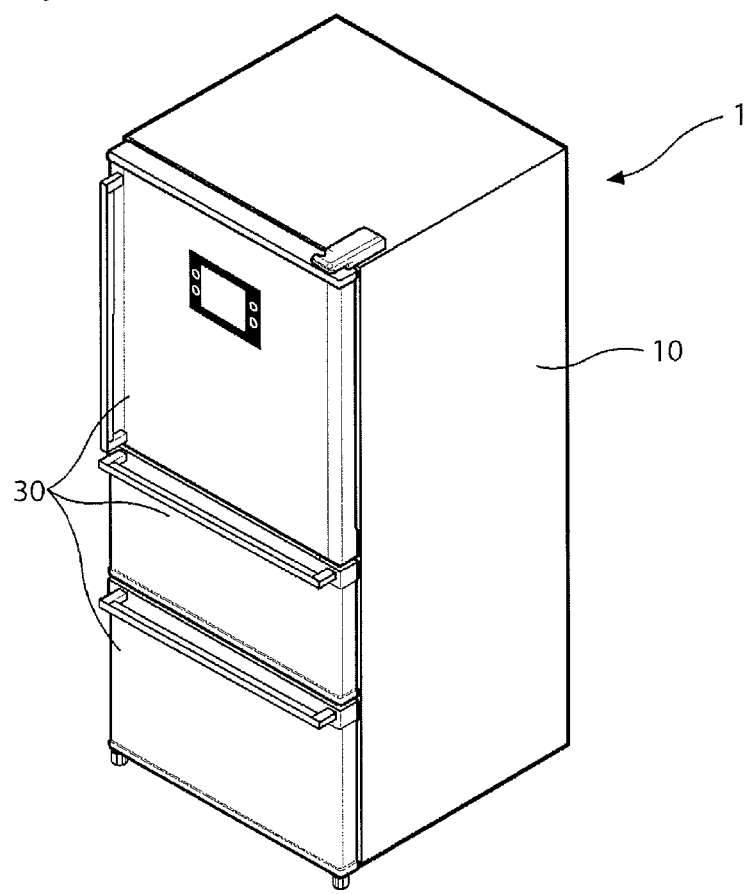
FIG. 1 is a perspective view of the exterior of a refrigerator according to a first embodiment.
Figure 2:
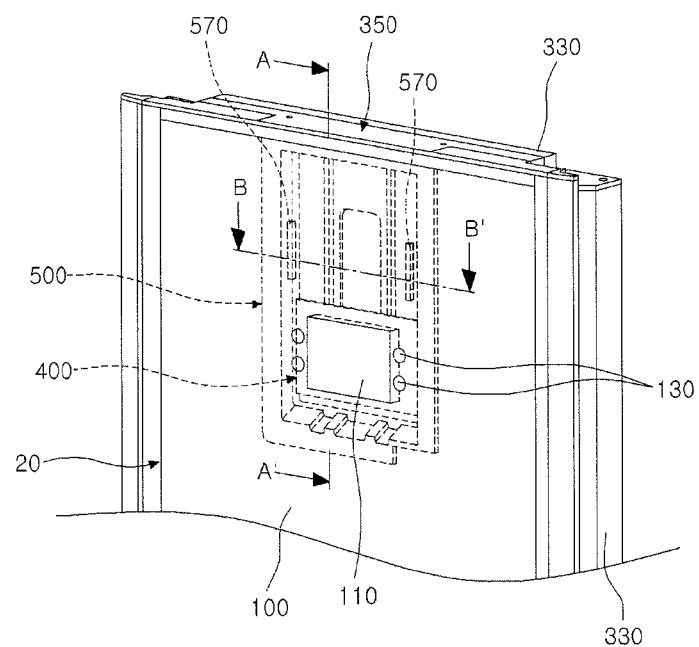
FIG. 2 is a partial perspective view of a refrigerator door according to a first embodiment.

FIG. 1 is a perspective view of the exterior of a refrigerator according to a first embodiment, and FIG. 2 is a partial perspective view of a refrigerator door according to a first embodiment.

Referring to FIGS. 1 and 2, the refrigerator 1 according to the present embodiment includes a main body in which a storage chamber is formed, and at least one door 30 coupled movably to the main body 10 to open/close the storage chamber.

Although not shown, the main body 10 includes a panel member and an inner case, wherein a heat insulator such as expanded polystyrene (EPS) is foamly filled between the panel member and the inner case.

A display unit 400 displaying at least an operation state of the refrigerator 1 is provided on the door. And, the display unit 400 allows an operation condition of the refrigerator to be selected by means of a touch method by way of example.

A display window 110 allowing information displayed by the display unit 400 to be shown is formed on the front surface of the door corresponding to the position of the display unit through a front surface of the door 30. The display window 110 is formed to be transparent or translucent.

Manipulating parts 130 guiding a user's touch are displayed on both right and left sides based on the display window 110 of the door 30. The manipulating parts 130, which are formed in the portions corresponding to sensing units 450 (see FIG. 5) of the display unit 400, are printed or formed in a rugged shape on the front surface of the door 30 so that they can guide the positions of the sensing units 450.

And, sensors constituting the sensing units 450, which are capacitance sensors, sense microcurrent generated at the time of user's touch to generate input signals. Therefore, if a user touches the manipulating parts 130, the user's manipulation is sensed in the sensing units 450.

Figure 3:
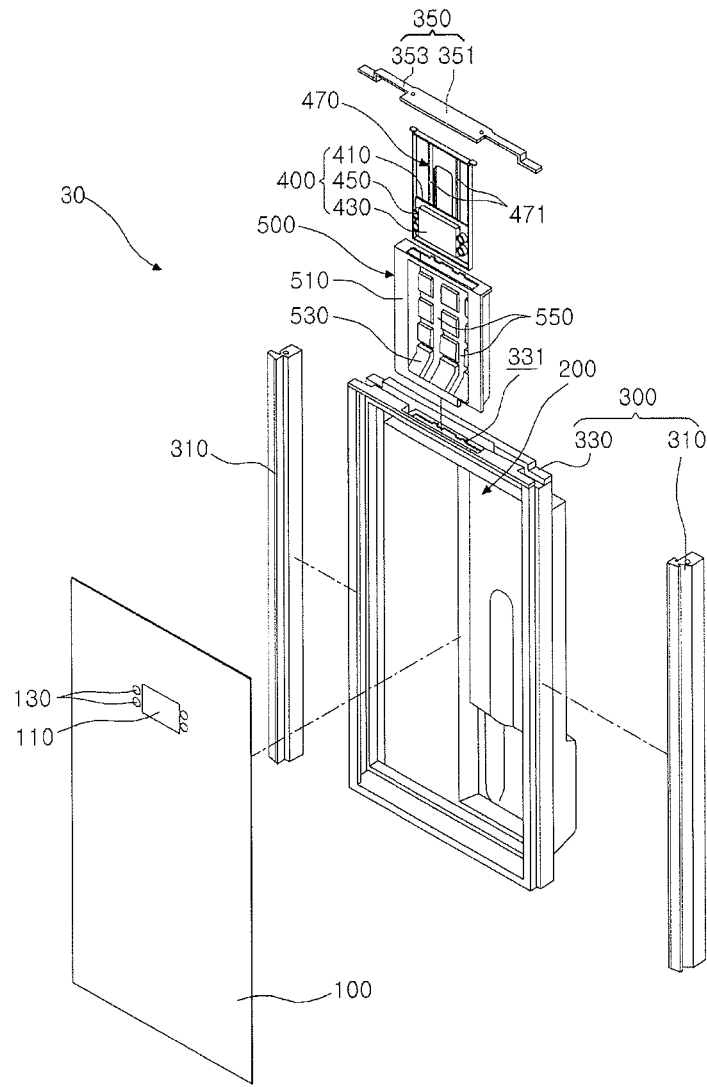
FIG. 3 is an exploded perspective view of a refrigerator door according to a first embodiment.
Figure 4:
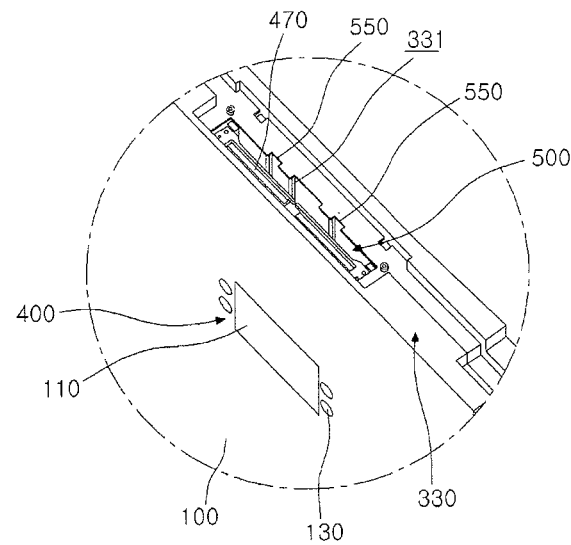
FIG. 4 is a partial perspective view showing a structure that a display unit according to a first embodiment is mounted to a refrigerator door.
Figure 5:
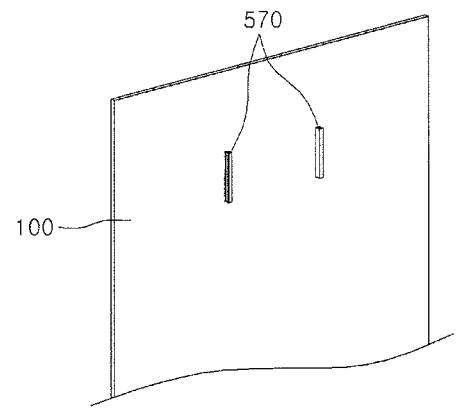
FIG. 5 is a rear perspective view of a front plate constituting a refrigerator door according to a first embodiment.

FIG. 3 is an exploded perspective view of a refrigerator door according to a first embodiment, FIG. 4 is a partial perspective view showing a structure that a display unit according to a first embodiment is mounted to a refrigerator door, and FIG. 5 is a rear perspective view of a front plate constituting a refrigerator door according to a first embodiment.

Referring to FIGS. 3 to 5, the door 30 includes a panel member 100 forming at least a portion of the exterior and an inner case 200 forming the shape of a rear surface. And, the panel member 100 is spaced from at least a portion of the inner case to form an insulation space and the insulation space is filled with insulating material 900.

The panel member 100 and the inner case 200 are coupled to each other by deco members 300, wherein the deco members 300 are coupled along edge boundaries of the panel member 100 and the inner case 200 to form a boundary surface of the door 30.

The panel member 100 is formed of tempered glass or plastic material, in an approximate rectangular plate shape, and a pattern is printed on the rear surface of the panel member 100.

The display window 110 is formed on the panel member 100 to be transparent or translucent. And, as described above, the manipulating parts 130 are formed on both right and left sides of the display window 110.

In the panel member 100, portions except the position of the display window 110 are colored and a separate printing job may be performed on the positions of the manipulating parts 130.

The inner case 200 is formed in a shape corresponding to the opening portion of a storage chamber formed in the main body 10. And, although not shown, gasket is provided to an edge of the door rider so that the storage chamber can keep airtight.

The deco member 300 includes a plurality of side decoes forming right and left sides of the door 30, and a plurality of cab decoes 330 forming up and down surfaces of the door 30.

Among the plurality of cab decoes 330, an inserting part 331 is formed on an upper side deco. The inserting part 331 provides a path for inserting the display unit 400.

A display case 500 guiding the insertion of the display unit 400 and supporting the display unit 400 is coupled to the upper side deco. And, the display unit 400 is silidingly mounted to the display case 500, penetrating through the inserting part 331 of the upper side deco.

The display case 500 is formed so that its front surface and upper surface are opened.

The display case 500 is coupled to the cab deco 330 (upper side deco) by a coupling member such as a screw.

And, the upper side deco is coupled to the panel member 100 and the inner case 200 in a state where the display case 500 is coupled to the upper side deco. Then, the display case 500 is positioned between the panel member 100 and the inner case 200, in a state where the display case 500 is coupled to the upper deco.

The front surface of the display case 500 is closely adhered to the rear surface of the panel member 100.

A bending part 510 is formed on the boundary of the opened front surface of the display case 500. The bending part 510 allows the opened front surface of the display case 500 to be closely adhered to the rear surface of the panel member 100. As the bending part 510 is closely adhered to the panel member 100, a separated space (display unit mounting space) isolated from the insulation space where the insulating material 900 is foamed may be formed on an inner side of the door 30.

A plurality of pressure parts 530 are formed on the inner side surface of the display case 500. The pressure parts 530 are projected forward from the inner side surface of the display case 500. The pressure parts 530 are closely adhered to the display unit 400 in a state where the display unit 400 is mounted to the display case 500 to pressurize the display unit 400 towards the panel member 100. As the pressure parts pressurize the rear surface of the display unit, the front surface of the display unit 400 can be closely adhered to the rear surface of the panel member 100 so that a back and forth movement of the display unit is prevented.

Guide rails 550 are formed on the inner surface of the display case 500. The guide rails 550 are formed by embedding a portion of the display case 500 backward and are extended upward and downward.

A plurality of guide rails 550 may be provided for a more stable sliding of the display unit 400, wherein the plurality of guide rails 550 are spaced right and left at a predetermined interval.

Meanwhile, a plurality of mounting guides 570 are provided on the rear surface of the panel member 100. The plurality of mounting guides 570 may, for example, be formed of plastic material to be coupled to the rear surface of the panel member, wherein the plurality of mounting guides 570 are spaced right and left.

The mounting guides 570 are coupled to the display unit 400 to guide the right and left positions to which the display unit 400 is inserted. And, the right and left movement of the display unit 400 can be prevented in a state where the display unit 400 is coupled to the mounting guide 570.

Of course, the mounting guides 570 may also be formed on the display case 500 rather than on the rear surface of the panel member 100.

Meanwhile, the display unit 400 includes a PCB board 410, a display part 430, a sensing part 450, and a unit guide 470. The PCB board 410 electrically connects the sensing part 450 to the display part 430 and controls each driving thereof.

The display part 430 is positioned in a central portion of the PCB board 410 and displays at least an operation state to the external. The display part 430 may, for example, be a LCD.

The sensing part 450 receives operating signals by a user's touch as described above.

The display part 430 and the sensing part 450 are mounted on the PCB board 410, and the PCT board 410 is mounted on the unit guide 470. And, the unit guide 470 is slidingly mounted on the display case 500.

Guide parts 471 projected backward are formed on the rear surface of the unit guide 470. And, the guide parts 471 are formed to be vertically long and are inserted into the inner sides of the guide rails 550.

Guide ribs 473 are formed on both right and left stages of the unit guide 470. The guide ribs 473 are coupled to the mounting guide 570.

A cover member 350 is coupled to the upper side deco. The cover member 350 selectively covers the inserting part 331. The cover member 350 includes a shielding part 351 shielding the inserting part 331 and a mount part 353 extended to both sides of the shielding part 351 to be coupled to the upper side deco.

In the present embodiment, the display unit 400 is described to be inserted into the inside of the door by penetrating through the upper side deco. However, the display unit 400 may also be inserted into the door by penetrating through a lower side deco or through the side deco 310.

Figure 6:
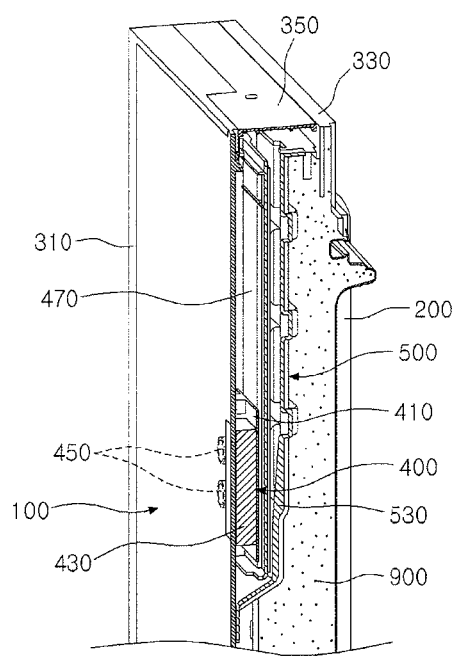
FIG. 6 is a cross-sectional view taken along line A-A' of FIG. 2.
Figure 7:
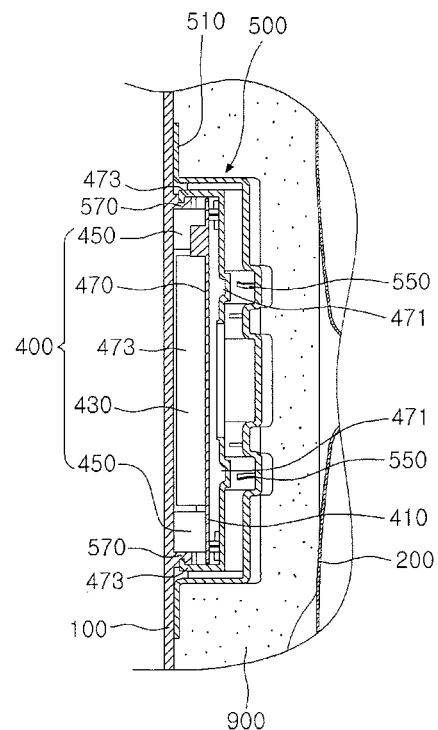
FIG. 7 is a cross-sectional view taken along line B-B' of FIG. 2.

FIG. 6 is a cross-sectional view taken along line A-A of FIG. 2, and FIG. 7 is a cross-sectional view taken along line B-B' of FIG. 2.

Referring to FIGS. 6 and 7, an assembling method of the door will be described.

First, in order to assemble the door 30, the panel member 100 and the door rider 200 are prepared. And, the panel member 100 and the inner case 200 are coupled to the side deco 310.

And, the panel member 100 and the inner case 200 are coupled to the lower side deco. And, after coupling the display case 500 to the upper side deco, the panel member 100 and the inner case 200 are coupled to the upper side deco 130. Then, an insulation space for filling insulating material 900 and a mounting space for mounting the display unit 400 are partitionally provided on the inner side of the door 30.

After the respective decoes 310 and 330 are coupled to the panel member 100 and the inner case 200, the insulating material 900 is foamly filled excepting for the space for mounting the display unit 400.

After the foam filling of the insulating material 900 on the inner side of the door 30 is completed, the display unit 400 is inserted into the inserting part 331 of the upper side deco. Then, the display unit 400 is coupled to the respective mounting guides 570 to be silidingly mounted to the display case 500.

After the display unit 400 is mounted on the display case 500, the cover member 350 is coupled to the upper side deco, thereby completing the assembling of the door.

Meanwhile, when the display unit 400 is checked or is trouble, the display unit 400 can be drawn out by the isolating cover member 350 from the upper side deco and then allowing the unit guides 470 to be slid upward. And, after the work is completed, the unit guide can be inserted again into its original position.

With the present embodiment, the display unit is mounted on the inner side of the door so that the display unit is not exposed to the outer side of the front panel, having an advantage that an esthetic sense of the front panel is improved.

Also, the display unit is inserted to the door after the filling of the insulating material is completed, having advantages that the assembling of the door is simplified and a manufacturing cost is reduced.

Also, the display unit can be slidingly drawn out from the door, having an advantage that the display unit can be checked and repaired.

Figure 8:
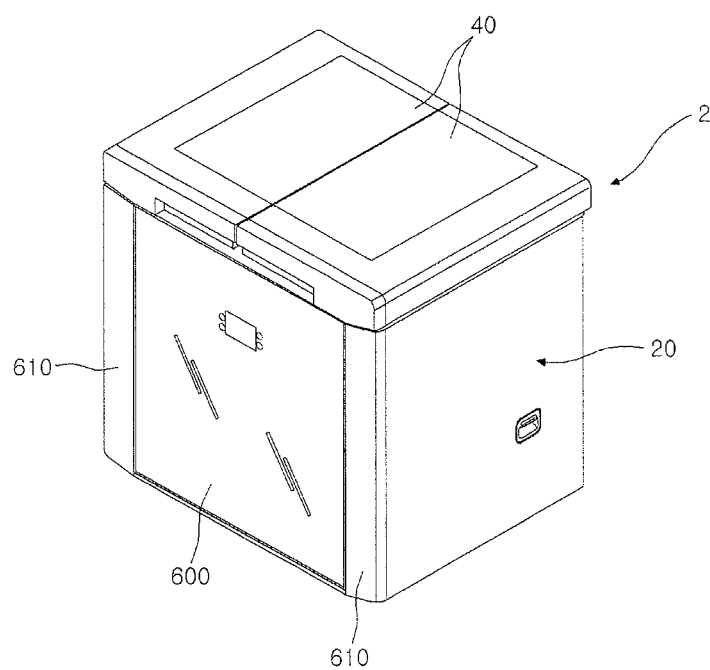
FIG. 8 is a perspective view of a refrigerator according to a second embodiment.
Figure 9:
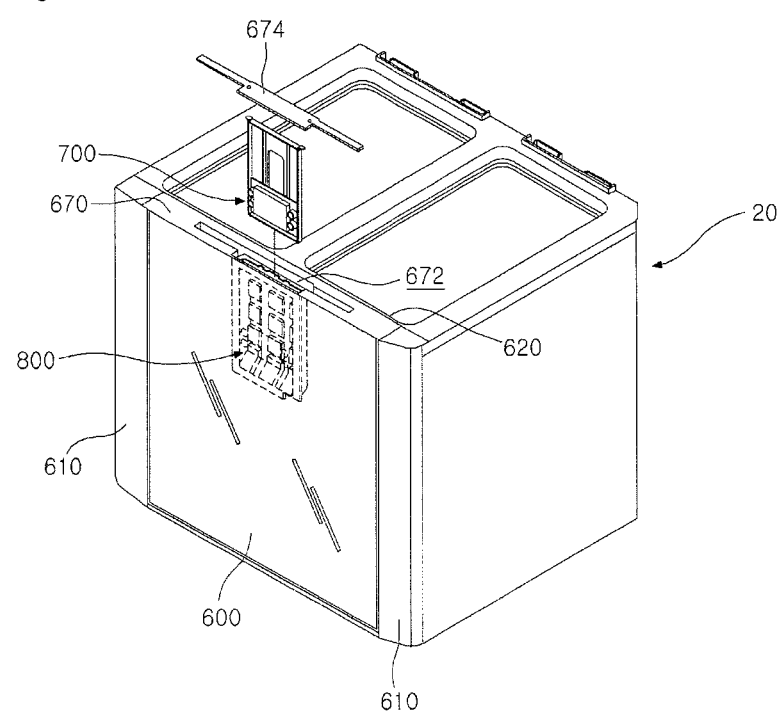
FIG. 9 is a perspective view showing a structure that a display unit according to a second embodiment is inserted to a refrigerator main body.

FIG. 8 is a perspective view of a refrigerator according to a second embodiment, and FIG. 9 is a perspective view showing a structure that a display unit according to a second embodiment is inserted to a refrigerator main body.

The present embodiment is the same as the first embodiment, excepting for the position on which the display unit is mounted. Therefore, only the characteristic portion of the present embodiment will be described hereinafter.

Referring to FIGS. 8 and 9, the refrigerator 2 according to the present embodiment includes a main body 20 in which a storage chamber is formed, and a door 4 coupled to an upper side of the main body 20 to open/close the storage chamber.

The main body 20 includes a panel member 600 forming at least a portion of the exterior and an inner case 620. Insulating material is foamly filled between the panel member 600 and the inner case 620.

The panel member 600 may, for example, be formed of tempered glass or plastic material, and the position of the panel member may be fixed by a side deco 610.

And, a cab deco 670 is coupled to an upper side of the panel member 600. An inserting part 672 for inserting a display unit 700 is inserted is formed on the cab deco. And, a display case 700 for mounting the display unit 700 is coupled to the cab deco 670. Also, a cover member 674 for covering the inserting part is coupled to the cab deco. And, the display unit is slidingly mounted to the display case after the insulating material between the panel member and the inner case is foamly filled.

The shape and coupling method of the display case are the same as those of the first embodiment so that the detailed description thereof will be omitted. Also, the mounting method of the display is the same as that of the first embodiment so that the detailed description thereof will be omitted.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A refrigerator, comprising:
   a front plate that forms at least a portion of a front exterior of a door of a refrigerator and comprising a display window formed to be transparent or translucent, and a manipulating part;
   a door liner spaced apart from the front plate;
   at least one side deco that forms at least a portion of a side exterior of the door and connects the front plate and the door liner;
   at least one cap deco that forms at least a portion of an upper or a lower exterior of the door and connects the front plate and the door liner;
   insulating material filled and foamed in a space defined by the front plate, the door liner, the at least one side deco and the at least one cap deco, the insulating material contacting the front plate, the door liner, the at least one side deco and the at least one cap deco;
   a display case disposed in the space and in contact with the insulating material and a rear surface of the front plate;
   an inserting part formed on the at least one side deco or the at least one cap deco and communicating with a receiving space defined by the rear surface of the front plate and the display case; and
   a unit guide on which a display unit is mounted, the display unit comprising a printed circuit board, a display part and a sensing part, both the display part and the sensing part being mounted on the printed circuit board, the unit guide being mounted on the display case,
   wherein the unit guide is inserted in the receiving space defined by the rear surface of the front plate and the display case through the inserting part formed on the at least one side deco or the at least one cap deco.

2. The refrigerator according to claim 1, further comprising a pressure part configured to pressurize the display unit toward the rear surface of the front plate.

3. The refrigerator according to claim 2, wherein the pressure part is disposed on the display case.

4. The refrigerator according to claim 3, wherein the pressure part is inclined toward the rear surface of the front plate.

5. The refrigerator according to claim 1, further comprising a cover member to cover the inserting part.

6. The refrigerator according to claim 1, wherein the display case comprises a front opening and an inserting opening in which the unit guide is inserted.

7. The refrigerator according to claim 6, wherein a bending part is formed on the front opening to be closely adhered to the rear surface of the front plate.

8. The refrigerator according to claim 6, wherein the inserting opening is arranged to face with the inserting part.

9. The refrigerator according to claim 1, wherein the display case is mounted on the at least one side deco or the at least one cap deco before filling of the insulating material in the space defined by the front plate, the door liner, the at least one side deco and at least one cap deco.

10. The refrigerator according to claim 1, wherein the front plate is a flat plate and the display window is formed on a portion of the flat plate.

11. The refrigerator according to claim 1, wherein the manipulating part to be touched by a user is formed on a front surface of the front plate corresponding to the sensing part.

12. The refrigerator according to claim 1, wherein the front plate is provided with a display guide to guide a mounting location of the display unit.

13. The refrigerator according to claim 1, wherein the display case is provided with a guide rail to guide a mounting location of the unit guide, and the unit guide is provided with a guide portion that slides along the guide rail.

14. The refrigerator according to claim 1, wherein the display part displays an operation state of the refrigerator.

15. The refrigerator according to claim 1, wherein the front plate is formed of tempered glass or plastic material.

16. A refrigerator, comprising:
a front plate provided with a display window formed to be transparent or translucent, the front plate forming at least a portion of a front exterior of a door of a refrigerator;
a door liner spaced apart from the front plate;
at least one side deco that connects the front plate and the door liner and forms at least a portion of a side exterior of the door;
at least one cap deco that connects the front plate and the door liner and forms at least a portion of an upper or a lower exterior of the door;
insulating material filled and foamed in a space defined by the front plate, the door liner, the at least one side deco and the at least one cap deco, the insulating material contacting the front plate, the door liner, the at least one side deco and the at least one cap deco;
a display case disposed in the space and in contact with the insulating material and a rear surface of the front plate;
a unit guide on which a display unit is mounted, the display unit comprising a printed circuit board and a display part mounted on the printed circuit board, the unit guide being mounted on the display case,
wherein the unit guide is inserted in a receiving space defined by the rear surface of the front plate and the display case through an inserting part formed on the at least one side deco or the at least one cap deco, and
wherein the inserting part communicates with the receiving space.

17. The refrigerator according to claim 16, further comprising a pressure part configured to pressurize the display unit toward the rear surface of the front plate.

18. The refrigerator according to claim 17, wherein the pressure part is disposed on the display case.

19. The refrigerator according to claim 18, wherein the pressure part is inclined toward the rear surface of the front plate.

20. The refrigerator according to claim 16, further comprising a cover member to cover the inserting part.

21. The refrigerator according to claim 16, wherein the display case comprises a front opening and an inserting opening in which the unit guide is inserted.

22. The refrigerator according to claim 21, wherein a bending part is formed on the front opening to be closely adhered to the rear surface of the front plate.

23. The refrigerator according to claim 21, wherein the inserting opening is arranged to face with the inserting part.

24. The refrigerator according to claim 16, wherein the display case is mounted on the at least one side deco or the at least one cap deco before filling of the insulating material in the space.

25. The refrigerator according to claim 16, wherein the display unit further comprises a sensing part to sense a touch manipulation of a user, and
a manipulating part to be touched by the user for manipulating is formed on a front surface of the front plate corresponding to the sensing part.

26. The refrigerator according to claim 16, wherein the front plate is provided with a display guide to guide a mounting location of the display unit.

27. The refrigerator according to claim 16, wherein the display case is provided with a guide rail to guide a mounting location of the unit guide, and the unit guide is provided with a guide portion that slides along the guide rail.

28. A manufacturing method of a refrigerator door comprising:
mounting a display case on a cap deco or a side deco to define a receiving space in which a display unit is inserted, wherein one of the cap deco and the side deco includes an inserting part communicating with the receiving space;
connecting the cap deco and the side deco to a front plate to define a space in which insulating material is filled;
filling and foaming the insulation material in the space defined by the cap deco, the side deco and the front plate; and
inserting the display unit in the receiving space defined by the display case and a rear surface of the front plate through the inserting part of the cap deco or the side deco after filling and foaming the insulation material,
wherein the front plate forms at least a portion of a front exterior of the refrigerator door,
wherein the side deco forms at least a portion of a side exterior of the refrigerator door,
wherein the cap deco forms at least a portion of an upper or a lower exterior of the refrigerator door, and
wherein the insulating material contacts the front plate, a door liner, the side deco and the cap deco.

29. The manufacturing method according to claim 28, wherein the inserting the display unit in the receiving space comprises pressurizing the display unit toward the rear surface of the front plate such that the display unit is in contact with the rear surface of the front plate.

30. The manufacturing method according to claim 28, further comprising forming a display window on the front plate.

31. The manufacturing method according to claim 28, further comprising covering the inserting part by a cap cover.

32. The manufacturing method according to claim 28, wherein the connecting the cap deco and the side deco to the front plate comprises pressurizing the display case toward the rear surface of the front plate such that the display case is in contact with the rear surface of the front plate.

33. The manufacturing method according to claim 28, further comprising connecting the door liner to the cap deco and the side deco to define a space in which the insulating material is filled.

34. The manufacturing method according to claim 28, wherein the display unit is inserted in the receiving space in a state which the display unit is mounted on a unit guide.

35. A manufacturing method of a refrigerator door comprising:
    connecting a cap deco and a side deco to a front plate to define a space in which insulating material is filled;
    mounting a display case on the cap deco or the side deco to define a receiving space in which a display unit is inserted, wherein one of the cap deco and the side deco includes an inserting part;
    connecting the cap deco and the side deco to a door liner;
    filling and foaming the insulation material in the space defined by the cap deco, the side deco and the front plate; and
    inserting the display unit in the receiving space defined by the display case and a rear surface of the front plate through the inserting part of the cap deco or the side deco after filling and foaming the insulation material,
    wherein the front plate forms at least a portion of a front exterior of the refrigerator door,
    wherein the side deco forms at least a portion of a side exterior of the refrigerator door,
    wherein the cap deco forms at least a portion of an upper or a lower exterior of the refrigerator door, and
    wherein the insulating material contacts the front plate, the door liner, the side deco and the cap deco.

36. The manufacturing method according to claim 35, wherein the inserting the display unit in the receiving space comprises pressurizing the display unit toward the rear surface of the front plate such that the display unit is in contact with the rear surface of the front plate.

37. The manufacturing method according to claim 35, further comprising forming a display window on the front plate.

38. The manufacturing method according to claim 35, further comprising covering the inserting part by a cap cover.

39. The manufacturing method according to claim 35, wherein the display unit is inserted in the receiving space defined by the rear surface of the front plate and the display case in a state which the display unit is mounted on a unit guide.

40. A refrigerator, comprising:
    a panel member provided with a display window formed to be transparent or translucent, the panel member forming at least a portion of a front exterior of a door of a refrigerator;
    an inner case spaced apart from the panel member;
    at least one side deco that connects the panel member and the inner case, the at least one side deco forming at least a portion of a side exterior of the door;
    at least one cap deco that connects the panel member and the inner case, the at least one cap deco forming at least a portion of an upper or lower exterior of the door;
    insulating material filled and foamed in a space defined by the panel member, the inner case, the at least one side deco and at least one cap deco, the insulating material contacting the panel member, the inner case, the at least one side deco and the at least one cap deco;
    a display case disposed in the space and in contact with the insulating material and a rear surface of the panel member;
    an inserting part formed on the at least one side deco or the at least one cap deco; and
    a unit guide on which a display unit is mounted, the display unit comprising a printed circuit board and a display part mounted on the printed circuit board,
    wherein the unit guide is inserted in a receiving space defined by the rear surface of the panel member and the display case through the inserting part formed on the at least one side deco or the at least one cap deco.

41. The refrigerator according to claim 40, further comprising a pressure part configured to pressurize the display unit toward the rear surface of the panel member.

42. The refrigerator according to claim 41, wherein the pressure part is disposed on the display case.

43. The refrigerator according to claim 41, wherein the pressure part is inclined toward the rear surface of the panel member.

44. The refrigerator according to claim 40, further comprising a cover member to cover the inserting part.

45. The refrigerator according to claim 40, wherein the display case comprises a front opening and an inserting opening in which the unit guide is inserted.

46. The refrigerator according to claim 45, wherein a bending part is formed on the front opening to be closely adhered to the rear surface of the panel member.

47. The refrigerator according to claim 40, wherein the display case is mounted on the at least one side deco or the at least one cap deco before filling of the insulating material.

48. The refrigerator according to claim 40, wherein a manipulating part to be touched by a user for manipulating is formed on a front surface of the panel member corresponding to a sensing part.

49. The refrigerator according to claim 40, wherein the display case is provided with a guide rail to guide a mounting location of the unit guide, and the unit guide is provided with a guide portion that slides along the guide rail.

50. The refrigerator according to claim 40, wherein the panel member is formed of tempered glass or plastic material.

* * * * *